US012696320B2

(12) United States Patent
Marcone et al.

(10) Patent No.: US 12,696,320 B2
(45) Date of Patent: Jul. 28, 2026

(54) RANDOM ACCESS CHANNEL OCCASION CONFIGURATION FOR MESSAGE 1 REPETITIONS

(71) Applicant: Nokia Technologies Oy, Espoo (FI)

(72) Inventors: Alessio Marcone, Munich (DE); Nhat-Quang Nhan, Massy (FR); Amir Mehdi Ahmadian Tehrani, Munich (DE); Marco Maso, Massy (FR)

(73) Assignee: Nokia Technologies Oy, Espoo (FI)

( * ) Notice: Subject to any disclaimer, the term of this patent is extended or adjusted under 35 U.S.C. 154(b) by 356 days.

(21) Appl. No.: 18/350,806

(22) Filed: Jul. 12, 2023

(65) Prior Publication Data

US 2024/0032108 A1 Jan. 25, 2024

(30) Foreign Application Priority Data

Jul. 21, 2022 (GB) ..................................... 2210646

(51) Int. Cl.
*H04W 74/0833* (2024.01)
*H04L 1/08* (2006.01)
(Continued)

(52) U.S. Cl.
CPC ........... *H04W 74/0833* (2013.01); *H04L 1/08* (2013.01); *H04W 56/001* (2013.01); *H04W 72/0446* (2013.01); *H04W 72/0453* (2013.01)

(58) Field of Classification Search
CPC ........... H04W 74/0833; H04W 56/001; H04W 72/0446; H04W 72/0453; H04L 1/08
(Continued)

(56) References Cited

U.S. PATENT DOCUMENTS

2019/0132882 A1 5/2019 Li et al.
2020/0383141 A1* 12/2020 Lei .................... H04W 74/0808
(Continued)

FOREIGN PATENT DOCUMENTS

EP 2903383 A1 8/2015

OTHER PUBLICATIONS

"3rd Generation Partnership Project; Technical Specification Group Radio Access Network; NR; Physical channels and modulation (Release 17)", 3GPP TS 38.211, V17.1.0, Mar. 2022, pp. 1-135.
(Continued)

*Primary Examiner* — Asad M Nawaz
*Assistant Examiner* — Hugh Mark Ashley
(74) *Attorney, Agent, or Firm* — Lippes Mathias LLP

(57) ABSTRACT

In accordance with example embodiments of the invention there is at least a method and apparatus to perform determining, by a network device of a communication network, random access channel parameters for random access to the communication network; based on the random access channel parameters, deriving a set of random access channel occasions in a time domain and frequency domain; based on the derived set of random access channel occasions, mapping or causing mapping of at least one synchronization signal block index to a number of at least one random access channel occasion of the set of random access channel occasions in at least one of the time domain or the frequency domain, wherein the mapping is based on a; and sending towards a network node of the communication network Msg1 preamble repetitions using at least part of the number of at least one random access channel occasions.

19 Claims, 12 Drawing Sheets

(51) Int. Cl.
  *H04W 56/00*      (2009.01)
  *H04W 72/0446*     (2023.01)
  *H04W 72/0453*     (2023.01)

(58) Field of Classification Search
  USPC ......................................................... 370/329
  See application file for complete search history.

(56)         References Cited

U.S. PATENT DOCUMENTS

2021/0058971 A1    2/2021  MolavianJazi et al.
2023/0054111 A1 *  2/2023  Rudolf ............. H04W 72/0446

OTHER PUBLICATIONS

"3rd Generation Partnership Project; Technical Specification Group Radio Access Network; NR; Physical layer procedures for control (Release 17)", 3GPP TS 38.213, V17.1.0, Mar. 2022, pp. 1-245.
"New WI: Further NR coverage enhancements", 3GPP TSG RAN Meeting #94e, RP-213579, Agenda: 8.6.1, China Telecom, Dec. 6-17, 2021, 5 pages.
"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
Combined Search and Examination Report received for corresponding United Kingdom Patent Application No. 2210646.2, dated Dec. 2, 2022, 4 pages.

* cited by examiner 0 1 2 3 4 5 6 7 8 9

10 ms = 1 FRAME

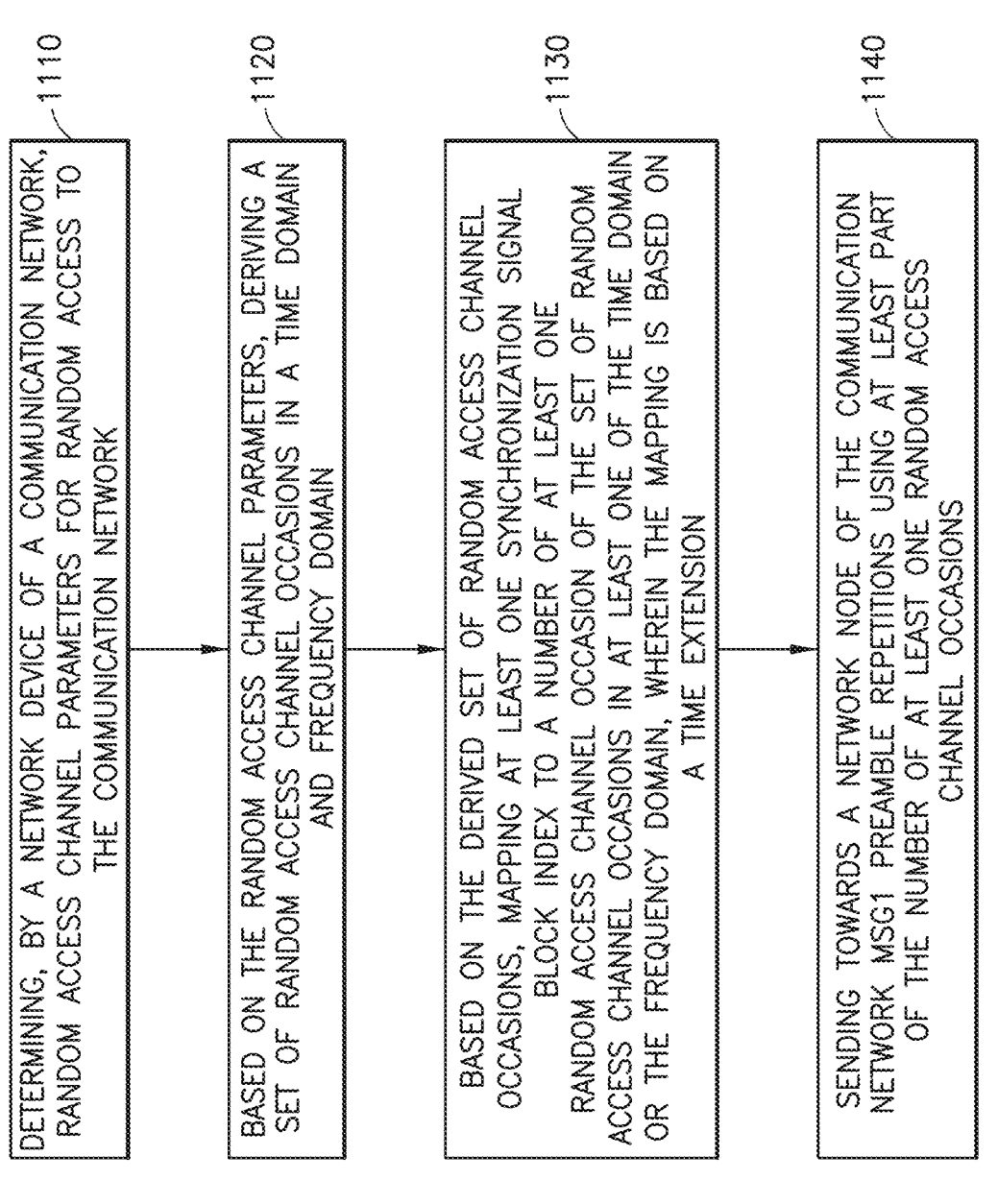

DETERMINING, BY A NETWORK DEVICE OF A COMMUNICATION NETWORK, RANDOM ACCESS CHANNEL PARAMETERS FOR RANDOM ACCESS TO THE COMMUNICATION NETWORK

1110

BASED ON THE RANDOM ACCESS CHANNEL PARAMETERS, DERIVING A SET OF RANDOM ACCESS CHANNEL OCCASIONS IN A TIME DOMAIN AND FREQUENCY DOMAIN

1120

BASED ON THE DERIVED SET OF RANDOM ACCESS CHANNEL OCCASIONS, MAPPING AT LEAST ONE SYNCHRONIZATION SIGNAL BLOCK INDEX TO A NUMBER OF AT LEAST ONE RANDOM ACCESS CHANNEL OCCASION OF THE SET OF RANDOM ACCESS CHANNEL OCCASIONS IN AT LEAST ONE OF THE TIME DOMAIN OR THE FREQUENCY DOMAIN, WHEREIN THE MAPPING IS BASED ON A TIME EXTENSION

1130

SENDING TOWARDS A NETWORK NODE OF THE COMMUNICATION NETWORK MSG1 PREAMBLE REPETITIONS USING AT LEAST PART OF THE NUMBER OF AT LEAST ONE RANDOM ACCESS CHANNEL OCCASIONS

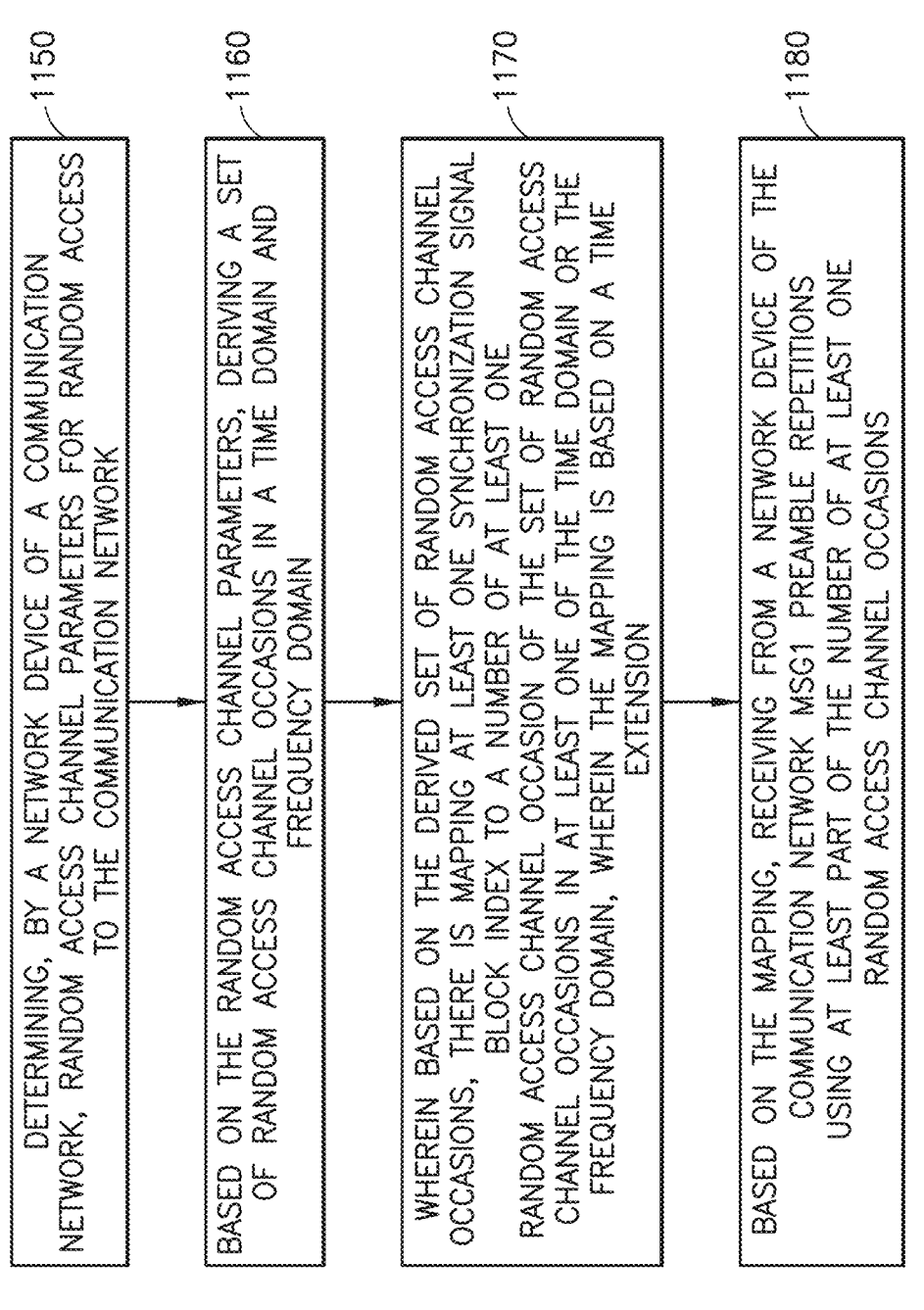

DETERMINING, BY A NETWORK DEVICE OF A COMMUNICATION NETWORK, RANDOM ACCESS CHANNEL PARAMETERS FOR RANDOM ACCESS TO THE COMMUNICATION NETWORK

1150

BASED ON THE RANDOM ACCESS CHANNEL PARAMETERS, DERIVING A SET OF RANDOM ACCESS CHANNEL OCCASIONS IN A TIME DOMAIN AND FREQUENCY DOMAIN

1160

WHEREIN BASED ON THE DERIVED SET OF RANDOM ACCESS CHANNEL OCCASIONS, THERE IS MAPPING AT LEAST ONE SYNCHRONIZATION SIGNAL BLOCK INDEX TO A NUMBER OF AT LEAST ONE RANDOM ACCESS CHANNEL OCCASION OF THE SET OF RANDOM ACCESS CHANNEL OCCASIONS IN AT LEAST ONE OF THE TIME DOMAIN OR THE FREQUENCY DOMAIN, WHEREIN THE MAPPING IS BASED ON A TIME EXTENSION

1170

BASED ON THE MAPPING, RECEIVING FROM A NETWORK DEVICE OF THE COMMUNICATION NETWORK MSG1 PREAMBLE REPETITIONS USING AT LEAST PART OF THE NUMBER OF AT LEAST ONE RANDOM ACCESS CHANNEL OCCASIONS

RANDOM ACCESS CHANNEL OCCASION CONFIGURATION FOR MESSAGE 1 REPETITIONS

RELATED APPLICATION

This application claims priority from, and the benefit of, Great Britain Application No. 2210646.2, filed on Jul. 21, 2022, the contents of which is incorporated herein by reference in its entirety.

TECHNICAL FIELD

The teachings in accordance with the exemplary embodiments of this invention relate generally to mapping at least one synchronization signal block index to at least one random access channel occasion across available slots and, more specifically, relate to mapping at least one synchronization signal block index to at least one random access channel occasion across available slots for prioritizing physical random access channel repetitions.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CBRA Contention Based Random Access
DDSUU: Downlink-Downlink-Special-Uplink-Uplink
DL Downlink
BUM: Frequency Domain Multiplexing
PR1: Frequency Range 1
PR2: Frequency Range 2
UE: User Equipment
gNB: NR Node B
MSG Message
Msg1: Message 1
PBCH Physical Broadcast Channel
PRACH: Physical Random Access Channel
RACH: Random Access Channel
RO: Rach Occasion
SS/PBCH: Synchronization Signal/Physical Broadcast Channel
SSB: Synchronization Signal Block
SIB1: System Information Block 1
UE User Equipment In 5G NR, two contention based random access (CBRA) procedures are supported, namely 4-step RACH (Rel-15) and 2-step RACH (Rel-16). In this application, there is focus on the former for illustration purpose and simplicity, but the proposed concept and the example embodiments of the invention are equally applicable to both CBRA procedures.

FIG. 1 shows an illustration of 4-step RACH procedure.

As shown in FIG. 1, the 4-step RACH procedure as shown in FIG. 1 can be summarized as follows:

Msg1 (a.k.a. PRACH): The UE sends a specific preamble to the gNB via physical random-access channel (PRACH) using a specific resource called RACH occasion (RO).

Msg2 (a.k.a. RAR): The gNB replies with a random-access response (RAR) message, which includes the detected preamble ID, the time-advance command, a TC-RNTI, and UL grant for the transmission of Msg3 on PUSCH;

Msg3 (a.k.a. RRC request): The UE responds to Msg2 over the scheduled PUSCH with an ID for contention resolution;

Msg4 (a.k.a. RRC setup): The gNB transmits the contention resolution message with the contention-resolution ID.

RACH occasions (RO) are the opportunities within a PRACH slot in which a PRACH preamble may be transmitted. However, a framework for determination of available ROs and slots for PRACH repetitions will have to be defined, in order for a UE to be able to understand on which slots to repeat the PRACH preamble, for a certain SS/PBCH index.

However, as the framework as defined at the time of this application is seen to be suboptimal for PRACH repetitions as demonstrated in this application, example embodiments of the invention as disclosed herein work to address at least this challenge of the framework as defined at the time of this application.

SUMMARY

This section contains examples of possible implementations and is not meant to be limiting.

In an example aspect of the invention, there is an apparatus, such as a user equipment side apparatus, comprising: at least one processor; and at least one non-transitory memory including computer program code, where the at least one memory and the computer program code are configured, with the at least one processor, to cause the apparatus to at least perform: determining, by a user equipment of a communication network, random access channel parameters for random access to the communication network; based on the random access channel parameters, deriving a set of random access channel occasions in a time domain and frequency domain; based on the derived set of random access channel occasions, mapping at least one synchronization signal block index to a number of at least one random access channel occasion of the set of random access channel occasions in at least one of the time domain or the frequency domain, wherein the mapping is based on a time extension; and sending towards a network node of the communication network Msg1 preamble repetitions using at least part of the number of at least one random access channel occasions.

In another example aspect of the invention, there is a method comprising: determining, by a user equipment of a communication network, random access channel parameters for random access to the communication network; based on the random access channel parameters, deriving a set of random access channel occasions in a time domain and frequency domain; based on the derived set of random access channel occasions, mapping at least one synchronization signal block index to a number of at least one random access channel occasion of the set of random access channel occasions in at least one of the time domain or the frequency domain, wherein the mapping is based on a time extension; and sending towards a network node of the communication network Msg1 preamble repetitions using at least part of the number of at least one random access channel occasions.

A further example embodiment is an apparatus and a method comprising the apparatus and the method of the previous paragraphs, wherein the random access channel parameters comprises the time extension, wherein the time extension is limiting the mapping of the at least one synchronization signal block index in the time domain, wherein the mapping is performed in the time domain in at least one random access channel occasion centered on at least one frequency in the frequency domain, wherein the mapping is derived from the initial mapping, wherein the mapping is performed in the time domain in different frequencies in the frequency domain, wherein the random access channel parameters comprise a stretching parameter and wherein the initial mapping is stretched in time according to the stretching parameter to derive the mapping, wherein more than one random access channel occasion of the set of random access channel occasions is configured in the frequency domain for a same time instance in the time domain, and wherein when the mapping reaches the time extension, the mapping continues in at least one random access channel occasion within the time extension in another frequency different than the different frequencies in the frequency domain, wherein more than one random access channel occasion of the set of random access channel occasions is configured in a frequency of the frequency domain for a same time instance in the time domain, and wherein based on the time extension being reached the mapping continues in at least one random access channel occasion in a frequency different than the frequency in the frequency domain within the time extension, wherein a number of the more than one random access channel occasion are used for the initial mapping and another number of the more than one random access channel occasion are used when the mapping has reached the time extension, wherein the random access channel parameters comprise at least one of: a number of consecutive random access channel occasions to map to a predetermined synchronization signal block index, a maximum number of repetitions for a predetermined synchronization signal block index, or a number of random access channel occasions in the frequency domain for a same time instance in the time domain, wherein the random access channel parameters comprise an indication of at least one of a number of synchronization signal block indexes to map per random access channel occasion or a number of preambles per synchronization signal block index, wherein based on determining that the mapped at least one random access channel occasion do not entirely fit within the time extension, there is: stopping mapping consecutively in the time domain and continues mapping in the frequency domain, in the first consecutive random access channel occasion in the frequency domain from slot number 0 of a first frame, wherein the time extension is expressed in least one of milliseconds, symbols, slots or frames to map the at least one synchronization signal block index to the at least one random access channel occasion in the time domain, wherein the time extension is further characterized by a time offset and periodicity, the time offset defined as the time of the first occurrence of the time extension and the periodicity defined as the number of at least one of milliseconds, symbols, slots or frames between the start of one time extension and the start of a next time extension, and/or wherein the time extension is one of pre-determined by the user equipment or received from the communication network.

A non-transitory computer-readable medium storing program code, the program code executed by at least one processor to perform at least the method as described in the paragraphs above.

In another example aspect of the invention, there is an apparatus comprising: means for determining, by a network node of a communication network, random access channel parameters for random access to the communication network; means, based on the random access channel parameters, for deriving a set of random access channel occasions in a time domain and frequency domain; means, based on the derived set of random access channel occasions, for mapping at least one synchronization signal block index to a number of at least one random access channel occasion of the set of random access channel occasions in at least one of the time domain or the frequency domain, wherein the mapping is based on a time extension; and means for sending towards a network node of the communication network Msg1 preamble repetitions using at least part of the number of at least one random access channel occasions.

In accordance with the example embodiments as described in the paragraph above, at least the means for determining, deriving, mapping, and sending comprises a network interface, and computer program code stored on a computer-readable medium and executed by at least one processor.

In a further example aspect of the invention, there is an apparatus, such as a network side apparatus, comprising: at least one processor; and at least one non-transitory memory including computer program code, where the at least one memory and the computer program code are configured, with the at least one processor, to cause the apparatus to at least perform: determining, by a network node of a communication network, random access channel parameters for random access to the communication network; based on the random access channel parameters, deriving a set of random access channel occasions in a time domain and frequency domain, wherein based on the derived set of random access channel occasions, there is mapping at least one synchronization signal block index to a number of at least one random access channel occasion of the set of random access channel occasions in at least one of the time domain or the frequency domain, wherein the mapping is based on a time extension; and based on the mapping, receiving from a user equipment of the communication network Msg1 preamble repetitions using at least part of the number of at least one random access channel occasions.

In another example aspect of the invention, there is a method comprising: determining, by a network node of a communication network, random access channel parameters for random access to the communication network; based on the random access channel parameters, deriving a set of random access channel occasions in a time domain and frequency domain, wherein based on the derived set of random access channel occasions, there is mapping at least one synchronization signal block index to a number of at least one random access channel occasion of the set of random access channel occasions in at least one of the time domain or the frequency domain, wherein the mapping is based on a time extension; and based on the mapping, receiving from a user equipment of the communication network Msg1 preamble repetitions using at least part of the number of at least one random access channel occasions.

A further example embodiment is an apparatus and a method comprising the apparatus and the method of the previous paragraphs, wherein the random access channel parameters comprises the time extension, wherein the time extension is limiting the mapping of the at least one synchronization signal block index in the time domain, wherein the mapping is performed in the time domain in at least one random access channel occasion centered on at least one frequency in the frequency domain, wherein the mapping is performed in the time domain, wherein an initial mapping is performed first in the frequency domain and then in the time domain in at least one random access channel occasion, wherein the mapping is performed in the time domain in different frequencies in the frequency domain, wherein the mapping is derived from the initial mapping, wherein more than one random access channel occasion of the set of random access channel occasions is configured in the frequency domain for a same time instance in the time domain, wherein when the mapping reaches the time extension, the mapping continues in at least one random access channel occasion within the time extension in another frequency different than the different frequencies in the frequency domain, wherein a number of the more than one random access channel occasion are used for the initial mapping and another number of the more than one random access channel occasion are used when the initial mapping has reached the time extension, wherein the random access channel parameters comprise at least one of: a number of consecutive random access channel occasions to map to a predetermined synchronization signal block index, a maximum number of repetitions for a predetermined synchronization signal block index, or a number of random access channel occasions to multiplex in a frequency domain, wherein the random access channel parameters comprise a stretching parameter and wherein the mapping is stretched in time according to the stretching parameter, wherein the random access channel parameters comprise an indication of at least one of a number of synchronization signal block indexes to map per random access channel occasion or a number of preambles per synchronization signal block index, wherein based on determining that the mapped at least one random access channel occasion do not entirely fit within the time extension, there is: stopping mapping consecutively in the time domain and continues mapping in the frequency domain, in the first consecutive random access channel occasion in the frequency domain from slot number 0 of a first frame, wherein the time extension is expressed in least one of milliseconds, symbols, slots or frames to map the at least one synchronization signal block index to the at least one random access channel occasion in a time domain, wherein the time extension is further characterized by a time offset and periodicity, the time offset defined as the time of the first occurrence of the time extension and the periodicity defined as the number of at least one of milliseconds, symbols, slots or frames between the start of one time extension and the start of a next time extension, and/or wherein the time extension is one of predetermined by the network node or received from the communication network.

A non-transitory computer-readable medium storing program code, the program code executed by at least one processor to perform at least the method as described in the paragraphs above.

In another example aspect of the invention, there is an apparatus comprising: means for determining, by a network node of a communication network, random access channel parameters for random access to the communication network; means, based on the random access channel parameters, for deriving a set of random access channel occasions in a time domain and frequency domain, wherein based on the derived set of random access channel occasions, there is means for mapping at least one synchronization signal block index to a number of at least one random access channel occasion of the set of random access channel occasions in at least one of the time domain or the frequency domain, wherein the mapping is based on a time extension; and means, based on the mapping, for receiving from a user equipment of the communication network Msg1 preamble repetitions using at least part of the number of at least one random access channel occasions.

In accordance with the example embodiments as described in the paragraph above, at least the means for determining, deriving, mapping, and receiving comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 11A and FIG. 11B each show a method in accordance with example embodiments of the invention which may be performed by an apparatus.

DETAILED DESCRIPTION

In example embodiments of this invention, there is provided at least a method and apparatus to perform mapping at least one synchronization signal block index to at least one random access channel occasion across available slots for prioritizing physical random access channel (PRACH) preamble repetitions.

Example embodiments of the invention relates to repetition of PRACH preambles. Where a network device such as a UE determines in which symbols to transmit a PRACH preamble for a given SS/PBCH index (beam direction) by following a SSB-to-RO mapping rule configured by the network.

As similarly stated above, a framework for determination of available slots and RO for PRACH repetitions will have to be defined, in order for a UE to be able to understand on which slots and ROs to repeat the PRACH preamble, for a certain SS/PBCH index. The framework as defined at the time of this application is indeed suboptimal for PRACH repetitions as demonstrated in this application.

RACH occasions (RO) are the opportunities within a PRACH slot in which a PRACH preamble may be transmitted. A network device determines an SSB-to-RO mapping, first by mapping each SSB to ROs within the frequency resource indices and then within the time domain resource indices. This mapping is used when deciding the RO(s) in which to transmit a PRACH preamble for a given SS/PBCH (beam direction).

It is worth noting that prior to Msg1, there is also a preliminary step of sending and receiving the synchronization signal block (SSB), i.e., DL beam sweeping, which is not formally part of the RACH procedure. As a result of this preliminary step, the UE selects the index of the preferred SS/PBCH beam and decodes the associated PBCH for MIB, SIB and so on. This index is also used by UE to identify a suitable RO for the preamble transmission (Msg1), according to the SSB-to-RO mapping implicitly conveyed by SIB1.

It is noted that 2 step RACH is similar to 4 step RACH presented above, but Msg1 and Msg3 are combined in a MsgA and sent out without waiting for feedback from the UE in between (traditionally Msg2). Similarly, the gNB combines Msg2 and Msg4 into MsgB. It is straightforward to apply the solutions disclosed in example embodiments of this invention for Msg1, to the preamble/Msg1 part of MsgA.

The time-domain resource for RACH occasions (ROs) is RRC configured by prach-ConfigurationIndex (in rach-ConfigGeneric), which acts as an indicator to a row of a table specified in 3GPP TS 38.211. With the parameters indicated by prach-ConfigurationIndex, the UE determines the preamble format for PRACH and applies the procedure specified in in 3GPP TS 38.211 to find the RO's in time-domain.

Figure 1:
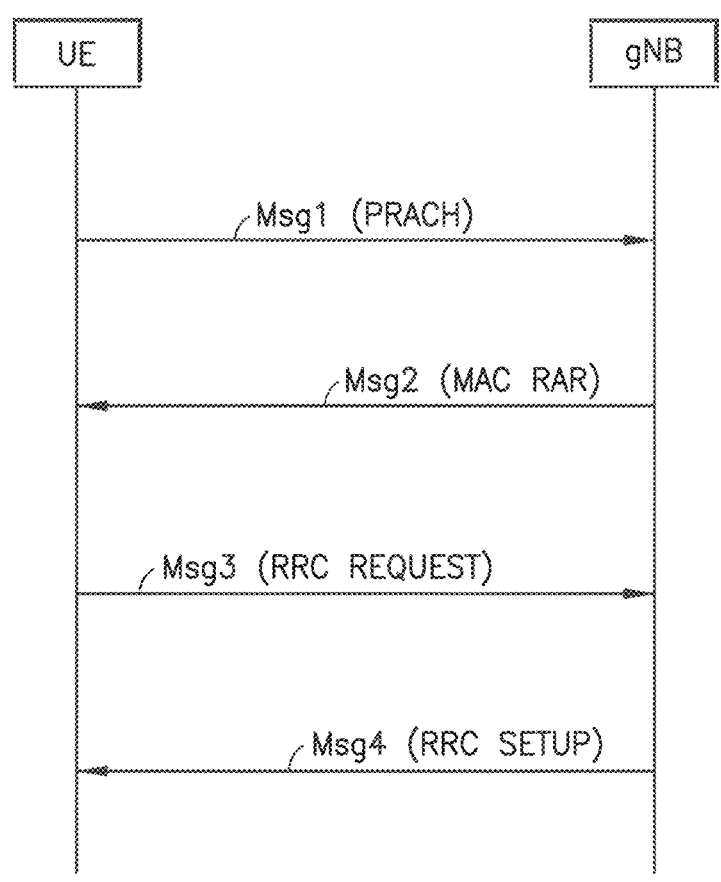
FIG. 1 shows an illustration of 4-step RACH procedure.
Figure 2:
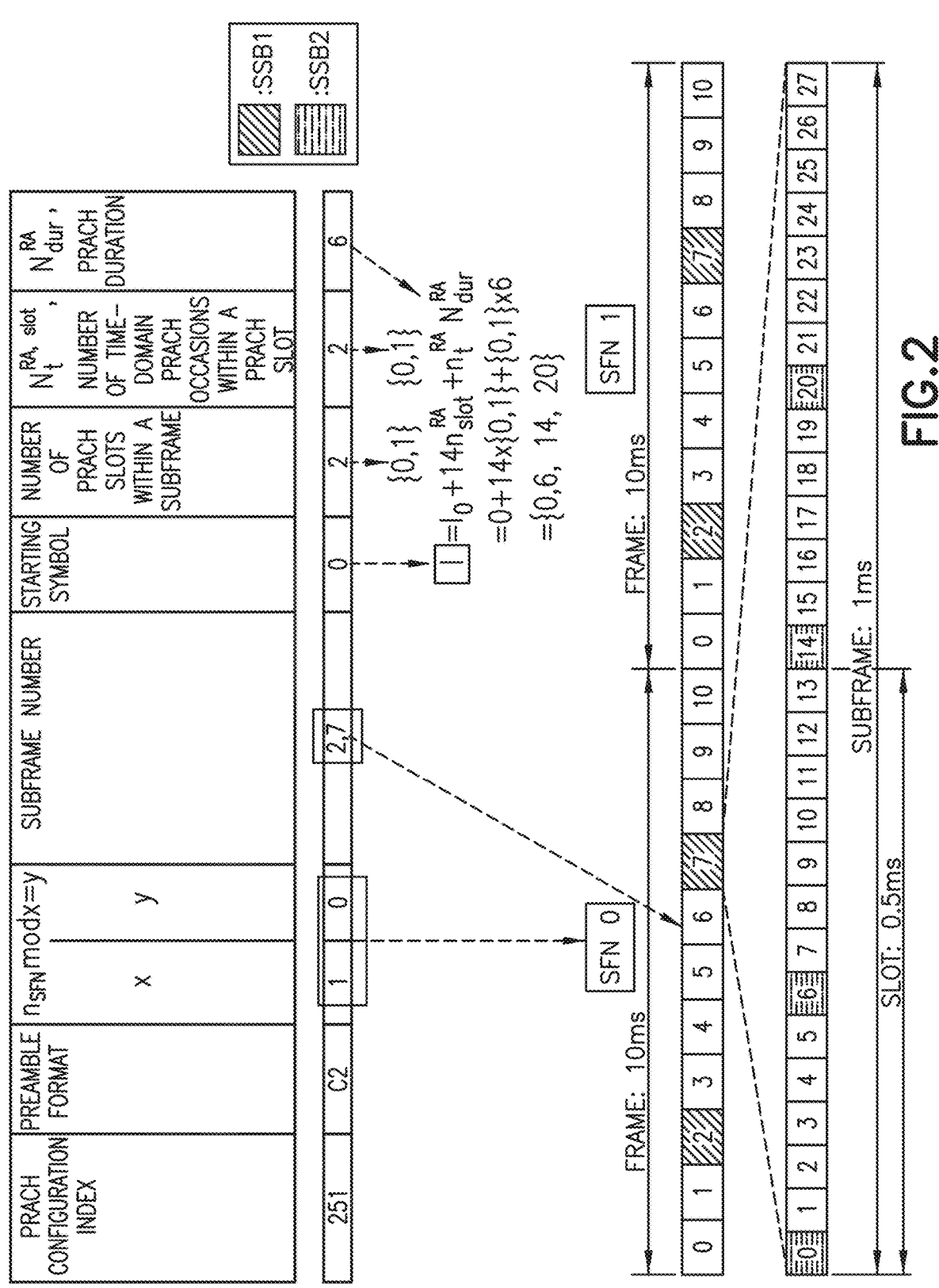
FIG. 2 shows an example of time-domain resource determination for RACH occasions.

FIG. 2 illustrates an example of time-domain resource determination for RACH occasions, wherein the prach-ConfigurationIndex is 251. With this index indicated, the UE determines the following:

Preamble format C2 should be used,

RO's are allocated at the system frame numbers ($n_{SFN}$) that satisfy $n_{SFN}$ mod 1=0 (i.e., all SFN numbers are valid), Within each of the determined SFNs, RO's are allocated at subframe number 2 and 7, Within each of the determined subframes, the remaining parameters in the considered row indicate that RO's will start at symbol number 0, 6, 14, 20. The symbol number is continuously counted regardless of the number of slots within the subframe, which depends on the sub-carrier spacing configured for PRACH, RO's duration is 6 symbols (although the actual duration of the preamble format can be less than that).

Finally, the validity of the determined RO's must be checked. According to 3GPP TS 38.213 (clause 8.1) an RO is determined as valid, if it is within UL symbols or if it has a sufficient gap after the last SS/PBCH/DL symbol in case it is within flexible symbols.

The parameters msg1-FrequencyStart and msg1-FDM configured in RACH-ConfigGeneric indicate the offset of the lowest RO in frequency domain and the number of RO's multiplexed in frequency domain for each time instance, respectively. The number of occupied resource blocks per RO, expressed in number of RBs for PUSCH, is specified in in Section 6.3.3.2 of 3GPP TS 38.211, depending on the configured preamble length and sub-carrier spacings for PRACH and PUSCH.

The mapping of SS/PBCH indexes to the determined RO's is fundamental for a UE to understand which RO's are associated to the SS/PBCH index selected during the preliminary step before the start of the RACH procedure. The different SS/PBCH indexes are beamformed in different directions in the cell, hence selection of a wrong SS/PBCH index may entail failure of the RACH procedure.

To this purpose, one fundamental parameter ssb-per-RACH-OccasionAndCB-PreamblesPerSSB is configured in RACH-ConfigCommon and indicates two information: (i) the number of SS/PBCH indexes per RO and (ii) the number of contention-based preambles per SS/PBCH index. Once this information is available to a UE, the UE maps the SS/PBCH indexes to the time-frequency grid of RO's (determined as described above) in increasing order of frequency resource indices, time resource indices of the RO's within a PRACH slots, and the PRACH slots, sequentially.

Figure 3:
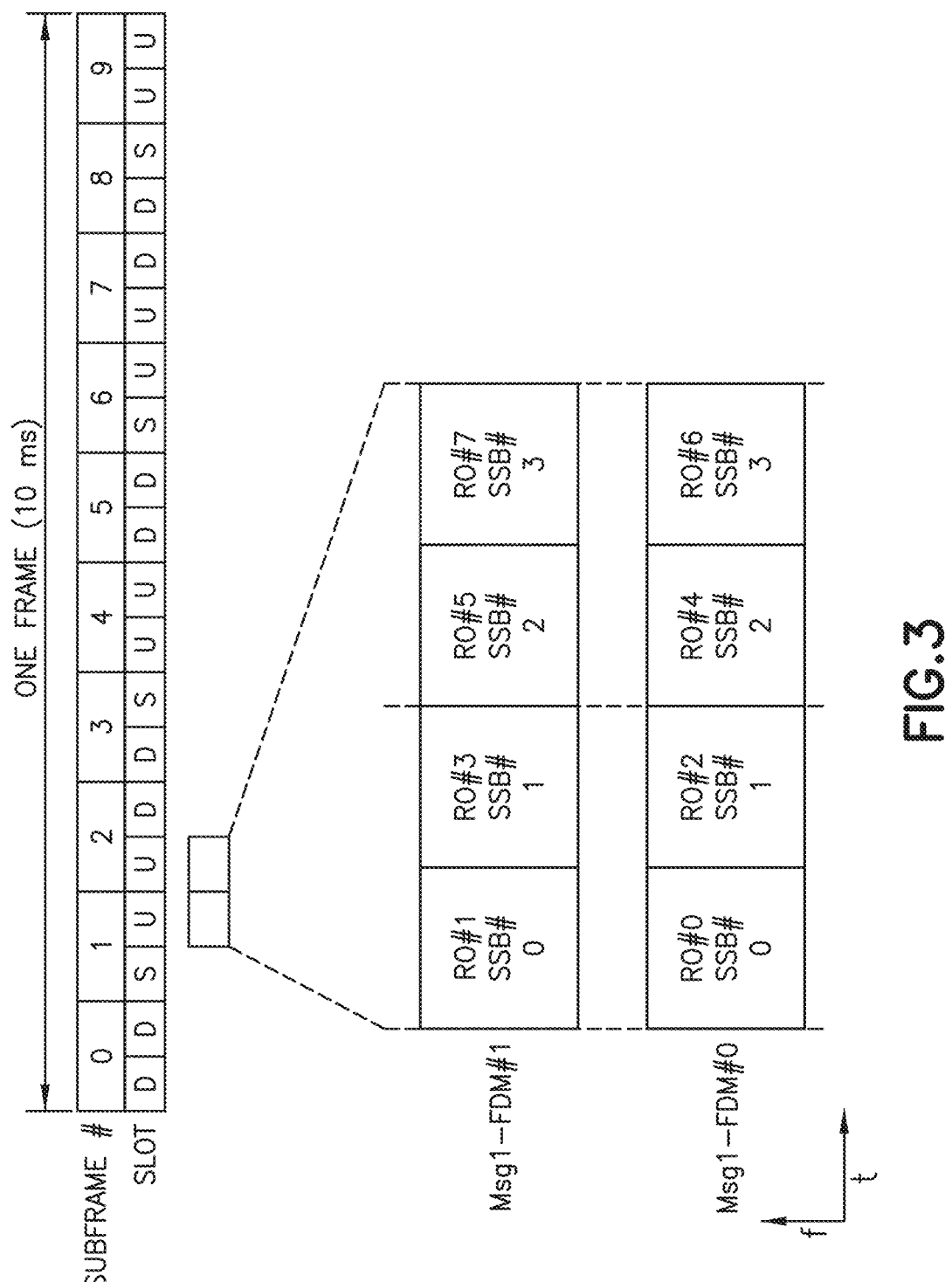
FIG. 3 shows an example of synchronization signal block to random access channel occasion mapping with prach-ConfigurationIndex 251 and UL/DL configuration DDSUU.

FIG. 3 illustrates an example of valid RO's in one frame and assuming the following configuration: DDSUU slot structure, Msg1-FDM=two, and ssb-perRACH-OccasionAndCB-PreamblesPerSSB is one-half. Based on the configuration, two RO's are multiplexed in the frequency domain (Msg1-FDM=two) and any two FDM'd RO's are mapped to the same SS/PBCH index (ssb-perRACH-OccasionAndCB-PreamblesPerSSB=½).

It can be noted that the following have been submitted for standards based UL coverage enhancements:

"[ . . . ]

Specify following PRACH coverage enhancements (RAN1, RAN2)

Multiple PRACH transmissions with same beams for 4-step RACH procedure

Study, and if justified, specify PRACH transmissions with different beams for 4-step RACH procedure Note 1: The enhancements of PRACH are targeting for FR2, and can also apply to FR1 when applicable.

Note 2: The enhancements of PRACH are targeting short PRACH formats, and can also apply to other formats when applicable.

[ . . . ]"

The network may configure a certain number of RO's for each SS/PBCH to support PRACH preamble repetition. However, according to the SSB-to-RO mapping rule, the UE maps mapping each SS/PBCH to RO's first within the frequency resource indices and then within the time domain resource indices.

Consequently, a PRACH preamble corresponding to a SS/PBCH will be repeated first in RO's in the frequency domain and then in the time domain. For example, in FIG. 3, the PRACH preamble corresponding to SS/PBCH #0 would be first repeated over RO #0 and RO #1.

The problem with repeating over the frequency domain, instead of the time domain, is that UE would lose 3 dB power per repetition, effectively nulling the gain provided by the repetitions.

A framework for determination of available slots for PRACH repetitions needs hence to be defined, in order for a UE to be able to understand on which slots to repeat the PRACH preamble, for a certain SS/PBCH index. The framework as defined at the time of this application, as described herein, is indeed suboptimal for PRACH repetitions as described in [0050] and [0051] and further demonstrated in the following two examples.

Figure 4:
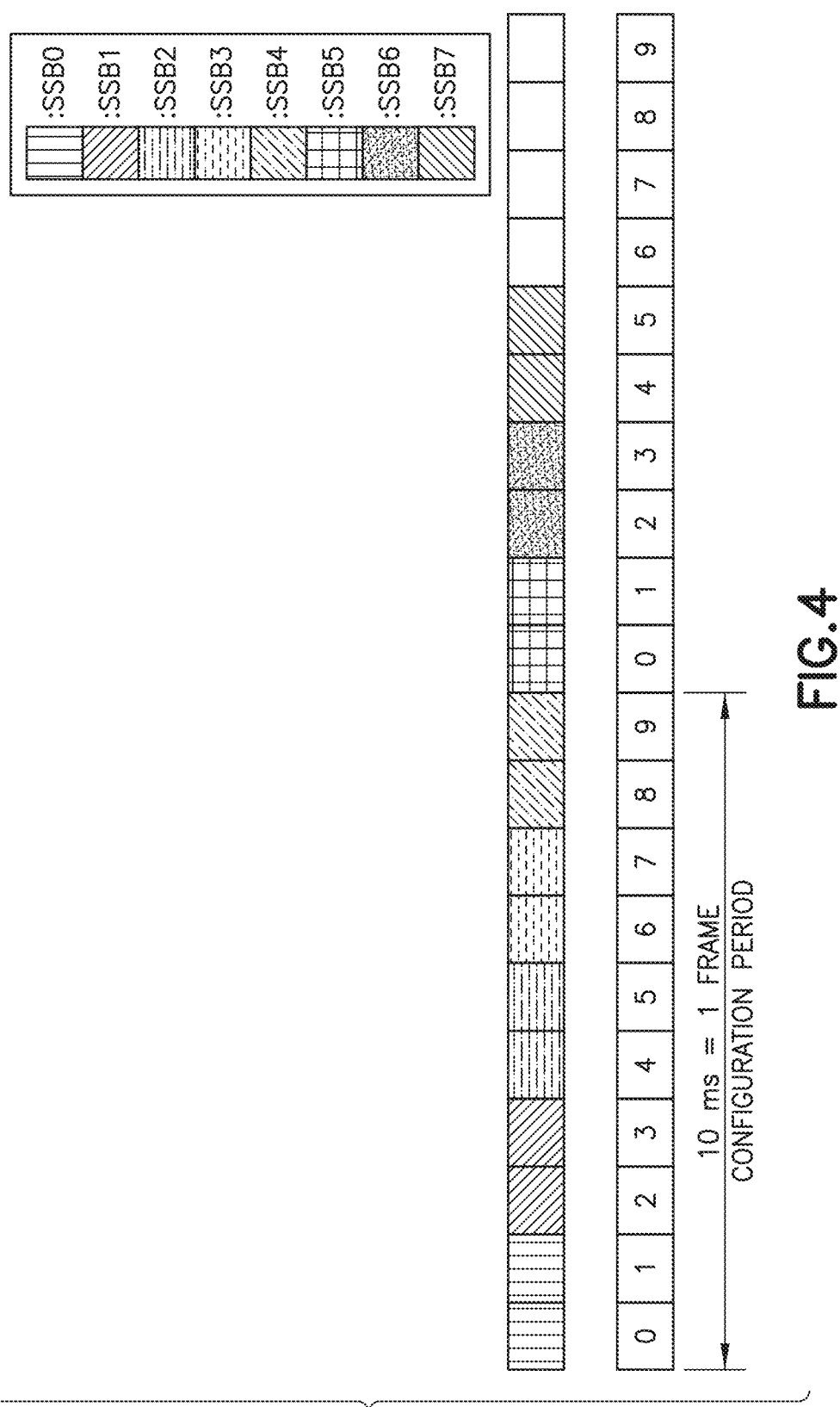
FIG. 4 shows a random access channel occasion pattern with ssb-perRACH-OccasionAndCB-PreamblesPerSSB set to oneHalf and Msg1-FDM to one.

In a first example, considering an FDD system (all slots are available) and a gNB configuring the CHOICE field of ssb-perRACH-OccasionAndCB-PreamblesPerSSB to one-Half (½) and Msg1-FDM to one, it is possible to achieve the RO pattern as shown in FIG. 4. This RO pattern enables two back-to-back PRACH repetitions, but delays access for UE belonging to any beam, compared to the case of ssb-perRACH-OccasionAndCB-PreamblesPerSSB set to one. In addition, with such a configuration, the network will experience an increase in the number of collisions, considering that in a longer period between two SS/PBCH occasions (i.e., 20 ms in this example compared to 10 ms in the case the CHOICE field of ssb-perRACH-OccasionAndCB-PreamblesPerSSB set to one), more UEs are likely to be requesting the network for initial access. These issues become more and more relevant the larger the number of repetitions (that is, the smaller the value of the CHOICE field of ssb-perRACH-OccasionAndCB-PreamblesPerSSB) configured. On the other hand, such a configuration is ideal for PRACH repetitions, since it allows the PRACH repetitions to experience the same channel conditions (since they are back-to-back) with a more efficient detection at gNB (receiver) side. Indeed, in such a case the repeated preambles would be received with a same delay by the gNB, allowing for efficient combining of the repetitions. Additionally, this configuration would have minimal burden on the buffering at the receiver (for combination of the repetitions), since the PRACH repetitions would be transmitted and processed in a minimum time interval.

Figure 5:
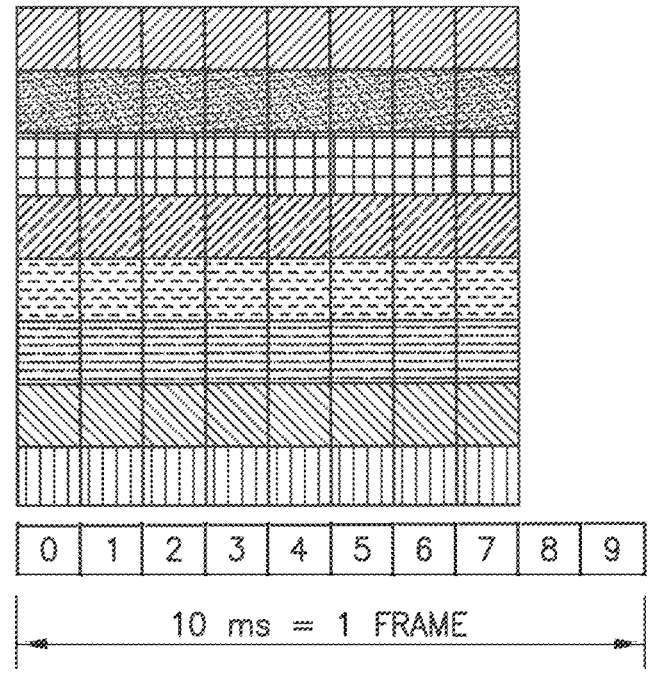
FIG. 5 shows a random access channel occasion pattern with ssb-perRACH-OccasionAndCB-PreamblesPerSSB set to one and Msg1-FDM to eight.
Figure 5:
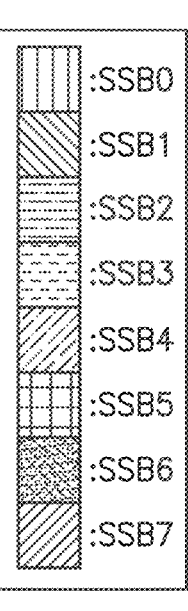

In another example, gNB sets the CHOICE field of ssb-perRACH-OccasionAndCB-PreamblesPerSSB to one but the Msg1-FDM field to eight, achieving the RO pattern in FIG. 5. Such an RO pattern is optimal for PRACH repetitions, providing up to 8 back-to-back repetition occasions, but it imposes a large burden on gNB receiver implementation since up to 8 spatial filters (beams) need to be created in the same time instance in different directions. In addition, such a configuration has a large span in the frequency domain, occupying around 17 MHz for certain PRACH formats. Of course, other hybrid RO patterns could be created by, for example, setting Msg1-FDM field to four, but then losing the possibility of getting back-to-back PRACH repetitions finally impacting PRACH detection performance and imposing a larger burden to gNB buffering and memory.

Figure 6:
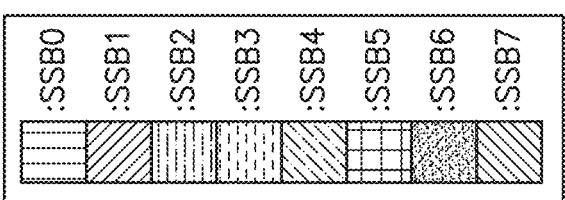
FIG. 6 shows a random access channel occasion pattern with ssb-perRACH-OccasionAndCB-PreamblesPerSSB set to Eight and Msg1-FDM to one.
Figure 6:
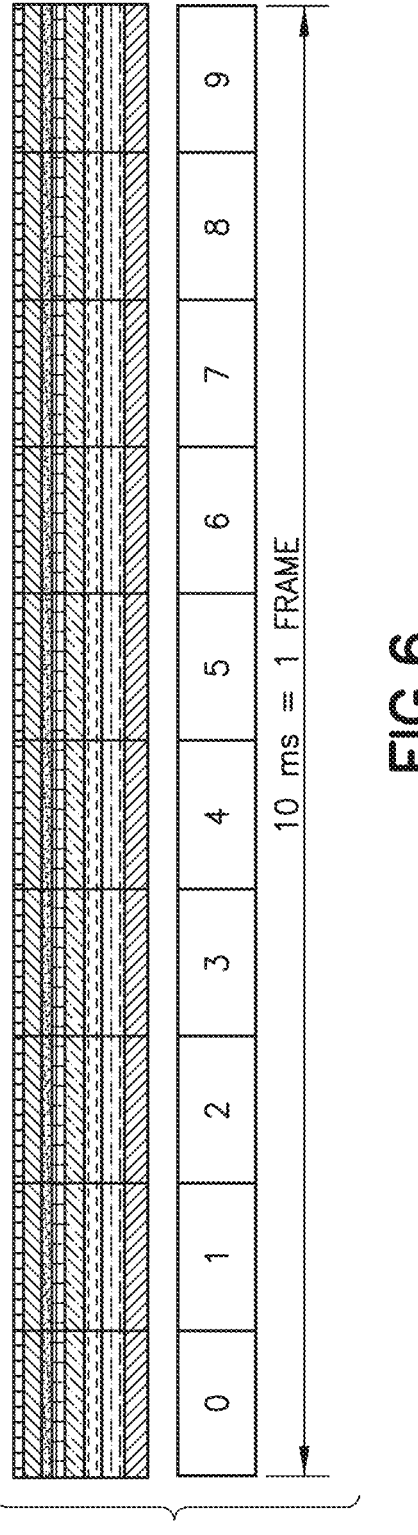

Another option would be to set the CHOICE field of ssb-perRACH-OccasionAndCB-PreamblesPerSSB to a number larger than 1, for example Eight, to enable back-to-back PRACH repetitions with minimum occupation in frequency domain as shown in FIG. 6. This configuration has however the substantial drawback of decreasing the number of usable preambles per SS/PBCH, hence increasing the probability of collision, and to impose a large burden on gNB receiver implementation since up to 8 spatial filters (beams) need to be created in the same time instance in different directions.

It is worth noticing that both configurations of FIG. 5 and FIG. 6 are hardly implementable in PR2, where the number of Tx RU of a gNB receiver is much lower than the number of antennas. One possibility for this type of implementation would be to split the larger antenna array into sub-arrays and associate each sub-array to one Tx RU, in order to be able to create multiple beams in different directions and in a same time instance. This splitting can however only be iterated a limited number of times, considering that a reduction of the number of antennas results in a link budget reduction for the specific beam (i.e. lower antenna gain), and configurations like the ones shown in FIG. 5 and FIG. 6 would result in a too large impact to the achievable antenna gain, that would finally impact PRACH performance.

In example embodiments of the invention there is at least methods and apparatus for providing a more flexible mapping of the SS/PBCH indexes to RO's across the available slots, prioritizing back-to-back repetitions but concurrently limiting the amount of SS/PBCH indexes multiplexed in the frequency domain, to limit the burden to gNB implementation. It is noted that an SS/PBCH index can also be referred to as a synchronization signal block index or SSB index for the reason that a synchronization signal and a PBCH channel are packed together as a single block.

Figure 10:
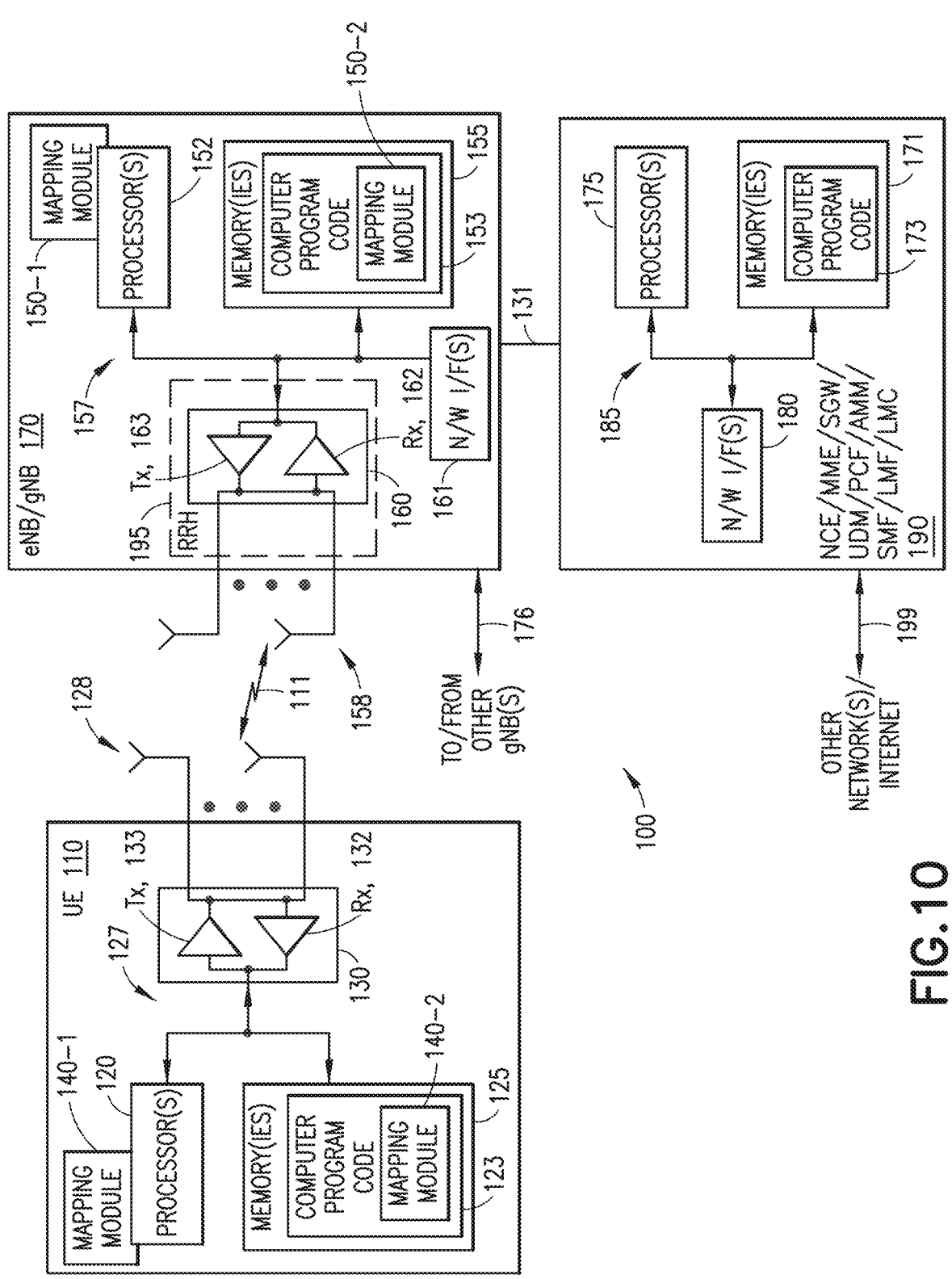
FIG. 10 shows a high level block diagram of various devices used in carrying out various aspects of the invention.

Before describing the example embodiments of the invention in further detail reference is made to FIG. 10. FIG. 10 shows a block diagram of one possible and non-limiting exemplary system in which the exemplary embodiments may be practiced.

As shown in FIG. 10, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an Bundling Module 140 which is configured to perform the example embodiments of the invention as described herein. The Bundling Module 140 may be implemented in hardware by itself of as part of the processors and/or the computer program code of the UE 110. The Bundling Module 140 comprising one of or both parts 140-1 and/or 140-2, which may be implemented in a number of ways. The Bundling Module 140 may be implemented in hardware as Bundling Module 140-1, such as being implemented as part of the one or more processors 120. The Bundling Module 140-1 may be implemented also as an integrated circuit or through other hardware such as a programmable gate array. In another example, the Bundling Module 140 may be implemented as Bundling Module 140-2, which is implemented as computer program code 123 and is executed by the one or more processors 120. Further, it is noted that the Bundling Modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with eNB/gNB 170 via a wireless link 111.

The eNB/gNB 170 (NR/5G Node B or possibly an evolved NB) is a base station (e.g., for LTE, long term evolution) that provides access by wireless devices such as the UE 110 to the wireless network 100. The eNB/gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The eNB/gNB 170 includes an Bundling Module 150 which is configured to perform example embodiments of the invention as described herein. The Bundling Module 150 may comprise one of or both parts 150-1 and/or 150-2, which may be implemented in a number of ways. The Bundling Module 150 may be implemented in hardware by itself or as part of the processors and/or the computer program code of the eNB/gNB 170. Bundling Module 150-1, such as being implemented as part of the one or more processors 152. The Bundling Module 150-1 may be implemented also as an integrated circuit or through other hardware such as a programmable gate array. In another example, the Bundling Module 150 may be implemented as Bundling Module 150-2, which is implemented as computer program code 153 and is executed by the one or more processors 152. Further, it is noted that the Bundling Modules 150-1 and/or 150-2 are optional. For instance, the one or more memories 155 and the computer program code 153 may be configured to cause, with the one or more processors 152, the eNB/gNB 170 to perform one or more of the operations as described herein. The one or more network interfaces 161 communicate over a network such as via the links 176 and 131. Two or more eNB/gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB/gNB 170 being physically in a different location from the RRH, and the one or more buses 157 could be implemented in part as fiber optic cable to connect the other elements of the eNB/gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The eNB/gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or eNB/gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, eNB/gNB 170, and/or NCE/MME/SGW/UDM/PCF/AMM/SMF/LMF/LMC 190 as in FIG. 10.

It is noted that functionality(ies), in accordance with example embodiments of the invention, of any devices as shown in FIG. 10 e.g., the UE 110 and/or eNB/gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 10 at least via the wireless link 111 and/or via the NCE/MME/SGW/UDM/PCF/AMM/SMF/LMF/LMC 190 using link 199 to Other Network(s)/Internet as in FIG. 10.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions, in addition for vehicles such as autos and/or truck and anal vehicles such as manned or unmanned anal vehicles and as well as portable units or terminals that incorporate combinations of such functions.

As similarly stated above example embodiments of the invention provide a more flexible mapping of the SS/PBCH indexes to RO's across the available slots, prioritizing back-to-back repetitions but concurrently limiting the amount of SS/PBCH indexes multiplexed in the frequency domain.

In accordance with example embodiments of the invention there is novel mapping SS/PBCH index-to-RO for PRACH repetitions targeting optimization of receiver detection performance in case of PRACH repetitions.

In one example embodiment of the invention, the mapping SS/PBCH index to RO is performed first in the time domain and only then in the frequency domain, in order to maximize the number of possible back-to-back repetitions in time domain for a certain SS/PBCH index.

In this case the parameters ssb-perRACH-OccasionAndCB-PreamblesPerSSB and Msg1-FDM may maintain the legacy meaning, wherein ssb-perRACH-OccasionAndCB-PreamblesPerSSB indicates the number of consecutive (in time) RO's to map to a certain SS/PBCH index (and implicitly the maximum number of repetitions for a certain SS/PBCH index), and Msg1-FDM indicates the number of RO's multiplexed in frequency domain.

The difference with the stated examples of FIG. 5 and FIG. 6 is that the number of digital beamformers to apply per unit of time would be lower, hence reducing the computational burden.

In a second example embodiment of the invention, the mapping is divided in two steps. In a first step UE maps the SS/PBCH indexes to the RO's according to the standardized mapping rules at the time of this application and only then, in a second step, the RO pattern is stretched according to a novel parameter indicated to UE to define the number of replicas in time domain of a single RO mapped to an SS/PBCH index.

Also, in this case the parameters ssb-perRACH-OccasionAndCB-PreamblesPerSSB and Msg1-FDM may maintain the legacy meaning, further new parameters may be defined for this new mapping;

In another example embodiments of the invention there is a novel indication of the duration of one time extension and its periodicity, the time extension defined as the maximum period of time (in MS, symbols, slots or frames) for a UE to map SS/PBCH indexes to RO's in a time domain, and the periodicity defined as the number of symbols/slots/frames/MS between one time extension and the next one.

Two levels of frequency domain mapping may also be configured (with possibly two different parameters), a first level used for the standardized mapping at the time of this application in the first step and a second level used only when the mapping has reached, after stretching according to the second step, the end of the time extension in the time domain. For example, 4 RO's could be configured in frequency domain for a same time instance, but only the first two are used for legacy mapping and the second two are used when the time domain mapping has reached the end of the time extension.

In addition, it is noted that in accordance with example embodiments of the invention this time extension can be pre-determined by the UE, the base station, or a communication network and forwarded from the communication network to the UE or the base station. Further, in accordance with example embodiments the time extension can be considered a repetition cycle.

Further, in accordance with example embodiments of the invention any mapping can be performed first in a frequency domain and then in a time domain, or vice versa.

Differently from the case of mapping first in frequency and then in time, for which an association period is automatically identified as defined in TS 38.213, here the duration of one time extension and its periodicity needs to be additionally determined and notified to UE, to avoid the UE spreading the SS/PBCH indexes in an excessively long period of time and incurring in large delays and probability of collision as analyzed herein.

When UE reaches the end of the time extension period, UE continues mapping the SS/PBCH indexes to RO's in frequency domain:

i. The mapping in frequency domain starts from another available RO in frequency domain, not yet mapped within the time extension, which could be different for the mapping in accordance with the example embodiments of the invention as described above, ii. The continued mapping in frequency domain may finish automatically whenever the UE has mapped the SS/PBCH indexes to RO's at least a number of times equal to the value of a specific parameter, which could be ssb-perRACH-OccasionAndCB-PreamblesPerSSB, or iii. The continued mapping in frequency domain may finish when the frequency domain RO's, determined based on the value of another parameter determining the number of RO's in frequency domain for a same time instance, as for example Msg1-FDM, within the whole time extension are fully occupied.

In accordance with example embodiments of the invention based on its receiver capability to create one or multiple beams in frequency domain, gNB could set a shorter or longer duration of the time extension, more or less compressing in time and aggregating in frequency different SS/PBCH indexes, respectively.

The proposed method provides at least the following advantages:

More flexible mapping between RO and SS/PBCH indexes, relaxing the constraints imposed by the standardized mapping rules at the time of this application, and optimizing the mapping for a PRACH repetition framework;

Possibility of back-to-back PRACH repetitions for a certain SS/PBCH index, enhancing PRACH detection performance;

Limited spread of PRACH occasions in time domain, compared to standardized implementation/mapping rules at the time of this application, allowing the PRACH occasions to be spread in a rather short period of time and yet accommodate PRACH repetitions.

In addition, there is provided an example implementation of the proposed procedures.

Figure 7:
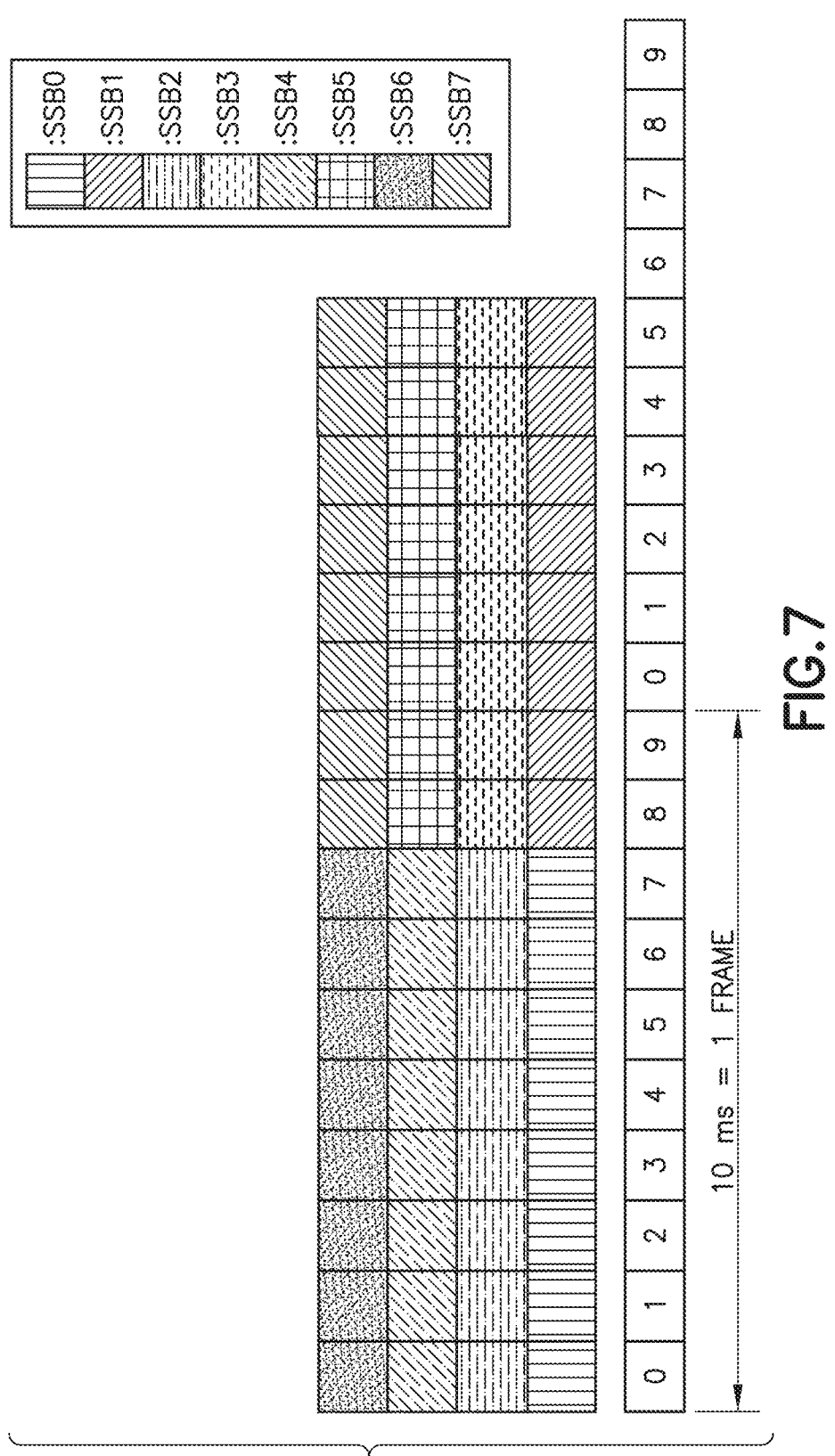
FIG. 7 shows an example implementation of the first embodiment with a number of synchronization signal blocks per random access channel occasion equal to $\frac{1}{8}$.

In an example implementation of the first embodiment for the SS/PBCH-to-RO mapping, a gNB sets the CHOICE field of the parameter ssb-perRACH-OccasionAndCB-PreamblesPerSSB to ⅛, and a duration of the time extension is equal to 2 frames in accordance with example embodiments of the invention. A sketch of the resulting mapping is shown in FIG. 7, wherein it is assumed that one slot comprises only one RO, as a non-limiting example.

The UE determines the mapping SS/PBCH-to-RO as follows:

1. Step 1: UE maps SS/PBCH index 0 in the first consecutive 8 RO's in time domain, starting from slot number 0
2. Step 2: UE keeps mapping SS/PBCH index 1 in the next consecutive 8 slots since the 8 RO's mapped to SS/PBCH 1 are still contained in the time extension of two frames;
3. Step 3: UE realizes that the next 8 RO's (to be mapped to SS/PBCH2) do not entirely fit within the time extension. UE stops mapping consecutively in the time domain, and continues mapping SS/PBCH index 2 in the frequency domain, in the first available and consecutive RO in frequency domain and from slot number 0 of the first frame; in a different implementation, UE would partly map SS/PBCH index 2 in the remaining 4 RO's before the end of the time extension, and continues the mapping in the first 4 available and consecutive RO's in frequency domain and from slot number 0 of the first frame.
4. Step 4: UE iterates Step 2 and Step 3, until each SS/PBCH indexes is mapped to at least 8 Ros, corresponding to the configured parameter ssb-perRACH-OccasionAndCB-PreamblesPerSSB.

Figure 8:
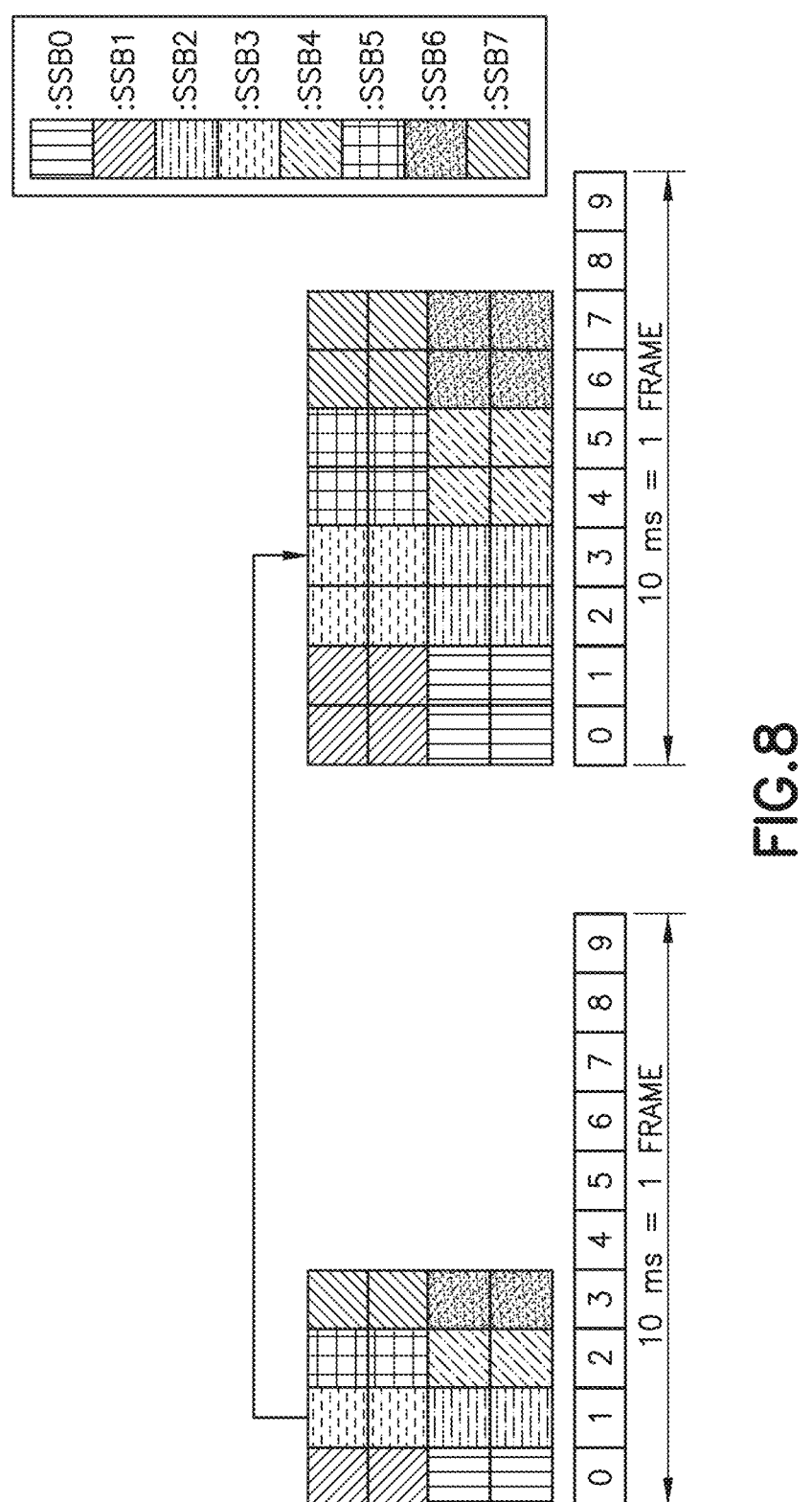
FIG. 8 shows an example implementation of the second embodiment with stretching parameter set to 2.
Figure 9:
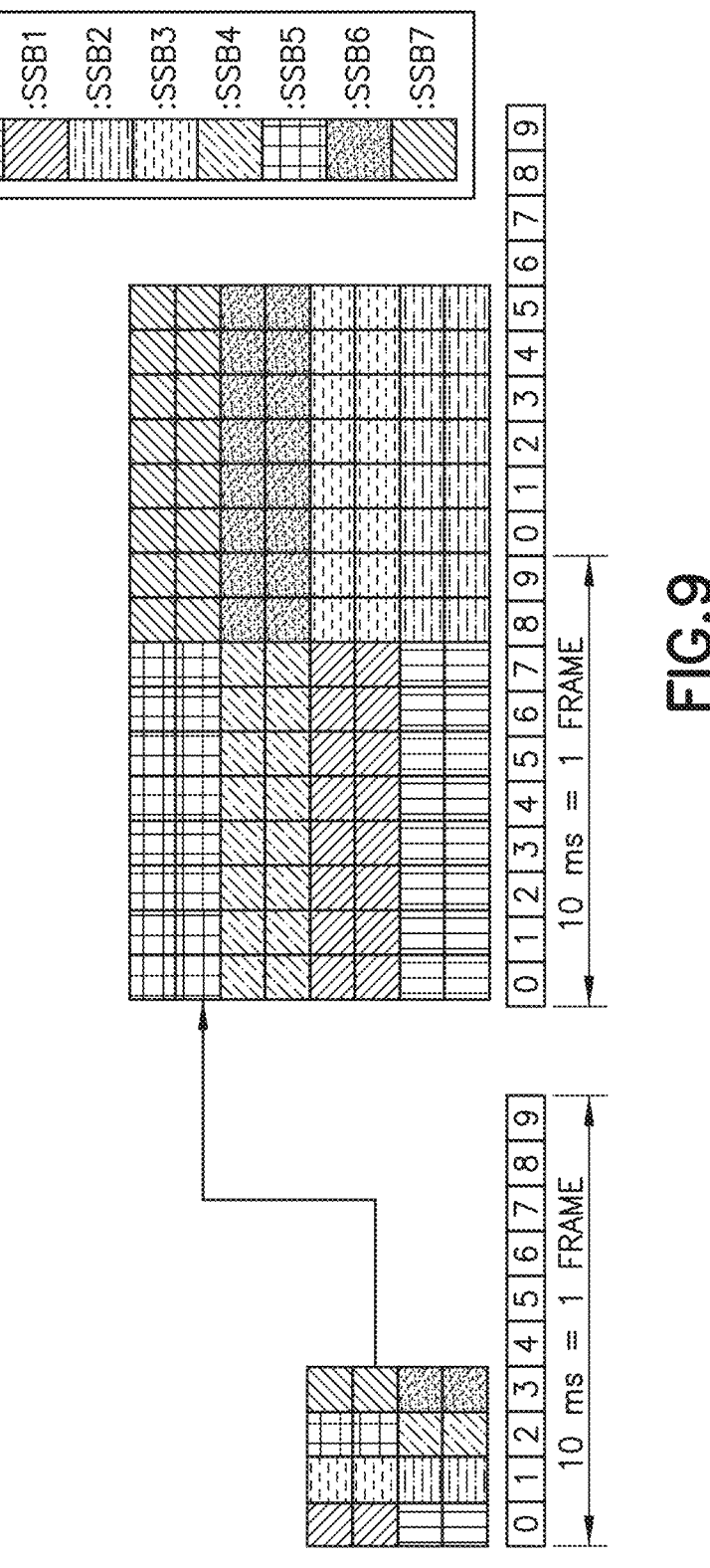
FIG. 9 shows Example implementation of the second embodiment with stretching parameter set to 8 and time extension duration set to 2 frames.

In an example implementation of the second embodiment for the SSB-to-RO mapping, a gNB sets the CHOICE field of the parameter ssb-perRACH-OccasionAndCB-PreamblesPerSSB to ½, Msg1-FDM to 4 and a duration of the time extension equal to 2 frames in accordance with example embodiments of the convention. In addition, gNB configures a stretching parameter of the SS/PBCH-to-RO mapping pattern to either 2 or 8. A sketch of the resulting mapping is shown in FIG. 8 and FIG. 9.

The UE determines the mapping SS/PBCH-to-RO as follows:

1. Step 1: UE determines the mapping SS/PBCH-to-RO following standardized procedures at the time of this application as described above, i.e., frequency first, time second, and based on the configured parameters ssb-perRACH-OccasionAndCB-PreamblesPerSSB and Msg1-FDM;
2. Step 2: UE stretches the mapping based on the stretching parameter as in the rightmost sketch of both Figures:
   a. It is worth noticing that since the stretched pattern is completely contained within 2 frames in the first example (FIG. 8) nothing else needs to be done, and
   b. It is worth noticing that since the stretched pattern is not completely contained within 2 frames in the second example (FIG. 9), the mapping of SS/PBCH4 to SS/PBCH7 are folded in frequency domain FIG. 11A and FIG. 11B each show a method in accordance with example embodiments of the invention which may be performed by an apparatus.

FIG. 11A illustrates operations which may be performed by a device such as, but not limited to, a device (e.g., the UE 110 as in FIG. 10). As shown in step 1110 of FIG. 11A there is determining, by a user equipment of a communication network, random access channel parameters for random access to the communication network. As shown in step 1120 of FIG. 11A there is, based on the random access channel parameters, deriving a set of random access channel occasions in a time domain and frequency domain. As shown in step 1130 of FIG. 11A there is, based on the derived set of random access channel occasions, mapping at least one synchronization signal block index to a number of at least one random access channel occasion of the set of random access channel occasions in at least one of the time domain or the frequency domain, wherein the mapping is based on a time extension. Then as shown in step 1140 of FIG. 11A there is sending towards a network node of the communication network Msg2 preamble repetitions using at least part of the number of at least one random access channel occasions.

In accordance with the example embodiments as described in the paragraph above, wherein the at least one random access channel occasions comprise consecutive at least one random access channel occasions.

In accordance with the example embodiments as described in the paragraph above, wherein the random access channel parameters comprises the time extension, wherein the time extension is limiting the mapping of the at least one synchronization signal block index in the time domain.

In accordance with the example embodiments as described in the paragraphs above, wherein the mapping is performed in the time domain in at least one random access channel occasion centered on at least one frequency in the frequency domain.

In accordance with the example embodiments as described in the paragraphs above, wherein an initial mapping is performed first in the frequency domain and then in the time domain in at least one random access channel occasion, and wherein the mapping is derived from the initial mapping.

In accordance with the example embodiments as described in the paragraphs above, wherein the mapping is performed in the time domain in different frequencies in the frequency domain In accordance with the example embodiments as described in the paragraphs above, wherein the random access channel parameters comprise a stretching parameter and wherein the initial mapping is stretched in time according to the stretching parameter to derive the mapping.

In accordance with the example embodiments as described in the paragraphs above, wherein more than one random access channel occasion of the set of random access channel occasions is configured in the frequency domain for a same time instance in the time domain, and wherein when the mapping reaches the time extension, the mapping continues in at least one random access channel occasion within the time extension in another frequency different than the different frequencies in the frequency domain.

In accordance with the example embodiments as described in the paragraphs above, wherein more than one random access channel occasion of the set of random access channel occasions is configured in a frequency of the frequency domain for a same time instance in the time domain, and wherein based on the time extension being reached the mapping continues in at least one random access channel occasion in a frequency different than in the frequency domain within the time extension.

In accordance with the example embodiments as described in the paragraphs above, wherein a number of the more than one random access channel occasion are used for the initial mapping and another number of the more than one random access channel occasion are used when the mapping has reached the time extension.

In accordance with the example embodiments as described in the paragraphs above, wherein the random access channel parameters comprise at least one of: a number of random access channel occasions to map to a predetermined synchronization signal block index, a maximum number of repetitions for a predetermined synchronization signal block index, or a number of random access channel occasions in the frequency domain for a same time instance in the time domain.

In accordance with the example embodiments as described in the paragraphs above, wherein the random access channel parameters comprise an indication of at least one of a number of synchronization signal block indexes to map per random access channel occasion or a number of preambles per synchronization signal block index.

In accordance with the example embodiments as described in the paragraphs above, wherein based on determining that the mapped at least one random access channel occasion do not entirely fit within the time extension, there is: stopping mapping in the time domain and continues mapping in the frequency domain, in the first random access channel occasion in the frequency domain from slot number 0 of a first frame.

In accordance with the example embodiments as described in the paragraphs above, wherein the time extension is expressed in least one of milliseconds, symbols, slots or frames to map the at least one synchronization signal block index to the at least one random access channel occasion in the time domain.

In accordance with the example embodiments as described in the paragraphs above, wherein the time extension is further characterized by a time offset and periodicity, the time offset defined as the time of the first occurrence of the time extension and the periodicity defined as the number of at least one of milliseconds, symbols, slots or frames between the start of one time extension and the start of a next time extension.

In accordance with the example embodiments as described in the paragraphs above, wherein the time extension is one of pre-determined by the user equipment or received from the communication network.

A non-transitory computer-readable medium (MEMORY(IES) 125 as in FIG. 10) storing program code (COMPUTER PROGRAM CODE 123 and/or Mapping Module 140-2 as in FIG. 10), the program code executed by at least one processor (PROCESSOR(S) 120 and/or Mapping Module 140-1 as in FIG. 10) to perform the operations as at least described in the paragraphs above.

In accordance with an example embodiment of the invention as described above there is an apparatus comprising: means for determining (one or more transceivers 130, Memory(ies) 125, Computer Program Code 123 and/or Mapping Module 140-2, and Processor(s) 120 and/or Mapping Module 140-1 as in FIG. 10), by a user equipment (UE 110 as in FIG. 10) of a communication network (Network 100 as in FIG. 10), random access channel parameters for random access to the communication network; means, based on the random access channel parameters, for deriving (one or more transceivers 130, Memory(ies) 125, Computer Program Code 123 and/or Mapping Module 140-2, and Processor(s) 120 and/or Mapping Module 140-1 as in FIG. 10) a set of random access channel occasions in a time domain and frequency domain; means, based on the derived set of random access channel occasions, for mapping (one or more transceivers 130, Memory(ies) 125, Computer Program Code 123 and/or Mapping Module 140-2, and Processor(s) 120 and/or Mapping Module 140-1 as in FIG. 10) at least one synchronization signal block index to a number of at least one random access channel occasion of the set of random access channel occasions in at least one of the time domain or the frequency domain, wherein the mapping is based on a time extension; then means for sending (one or more transceivers 130, Memory(ies) 125, Computer Program Code 123 and/or Mapping Module 140-2, and Processor(s) 120 and/or Mapping Module 140-1 as in FIG. 10) towards a network node of the communication network Msg1 preamble repetitions using at least part of the number of at least one random access channel occasions.

In the example aspect of the invention according to the paragraph above, wherein at least the means for determining, deriving, mapping or sending comprises a non-transitory computer readable medium [Memory(ies) 125 as in FIG. 10] encoded with a computer program [Computer Program Code 123 and/or Mapping Module 140-2 as in FIG. 10] executable by at least one processor [Processor(s) 120 and/or Mapping Module 140-1 as in FIG. 10].

FIG. 11B illustrates operations which may be performed by a device such as, but not limited to, a device (e.g., the eNB/gNB 170 as in FIG. 10). As shown in step 1150 of FIG. 11B there is determining, by a network node of a communication network, random access channel parameters for random access to the communication network. As shown in step 1160 of FIG. 11B there is, based on the random access channel parameters, deriving a set of random access channel occasions in a time domain and frequency domain. As shown in step 1170 of FIG. 11B wherein based on the derived set of random access channel occasions, there is mapping at least one synchronization signal block index to a number of at least one random access channel occasion of the set of random access channel occasions in at least one of the time domain or the frequency domain, wherein the mapping is based on a time extension. Then as shown in step 1180 of FIG. 11B there is based on the mapping, receiving from a user equipment of the communication network Msg1 preamble repetitions using at least part of the number of at least one random access channel occasions.

In accordance with the example embodiments as described in the paragraph above, wherein the at least one random access channel occasions comprise consecutive at least one random access channel occasions.

In accordance with the example embodiments as described in the paragraph above, wherein the random access channel parameters comprises the time extension, wherein the time extension is limiting the mapping of the at least one synchronization signal block index in the time domain.

In accordance with the example embodiments as described in the paragraphs above, wherein the mapping is performed in the time domain in at least one random access channel occasion centered on at least one frequency in the frequency domain.

In accordance with the example embodiments as described in the paragraphs above, wherein an initial mapping is performed first in the frequency domain and then in the time domain in at least one random access channel occasion, wherein the mapping is derived from the initial mapping.

In accordance with the example embodiments as described in the paragraphs above, wherein the mapping is performed in the time domain in different frequencies in the frequency domain.

In accordance with the example embodiments as described in the paragraphs above, wherein more than one random access channel occasion of the set of random access channel occasions is configured in the frequency domain for a same time instance in the time domain, and wherein when the mapping reaches the time extension, the mapping continues in at least one random access channel occasion within the time extension in another frequency different than the different frequencies in the frequency domain.

In accordance with the example embodiments as described in the paragraphs above, wherein a number of the more than one random access channel occasion are used for the initial mapping and another number of the more than one random access channel occasion are used when the initial mapping has reached the time extension.

In accordance with the example embodiments as described in the paragraphs above, wherein the random access channel parameters comprise at least one of: a number of consecutive random access channel occasions to map to a predetermined synchronization signal block index, a maximum number of repetitions for a predetermined synchronization signal block index, or a number of random access channel occasions to multiplex in a frequency domain.

In accordance with the example embodiments as described in the paragraphs above, wherein the random access channel parameters comprise a stretching parameter and wherein the mapping is stretched in time according to the stretching parameter.

In accordance with the example embodiments as described in the paragraphs above, wherein the random access channel parameters comprise an indication of at least one of a number of synchronization signal block indexes to map per random access channel occasion or a number of preambles per synchronization signal block index.

In accordance with the example embodiments as described in the paragraphs above, wherein based on determining that the mapped at least one random access channel occasion do not entirely fit within the time extension, there is: stopping mapping consecutively in the time domain and continues mapping in the frequency domain, in the first consecutive random access channel occasion in the frequency domain from slot number 0 of a first frame.

In accordance with the example embodiments as described in the paragraphs above, wherein the time extension is expressed in least one of milliseconds, symbols, slots or frames to map the at least one synchronization signal block index to the at least one random access channel occasion in a time domain.

In accordance with the example embodiments as described in the paragraphs above, wherein the time extension is further characterized by a time offset and periodicity, the time offset defined as the time of the first occurrence of the time extension and the periodicity defined as the number of at least one of milliseconds, symbols, slots or frames between the start of one time extension and the start of a next time extension.

In accordance with the example embodiments as described in the paragraphs above, wherein the time extension is one of predetermined by the network node or received from the communication network.

A non-transitory computer-readable medium (MEMORY (IES) 155 as in FIG. 10) storing program code (COMPUTER PROGRAM CODE 153 and/or Mapping Module 150-2 as in FIG. 10), the program code executed by at least one processor (PROCESSOR(S) 152 and/or Mapping Module 150-1 as in FIG. 10) to perform the operations as at least described in the paragraphs above.

In accordance with an example embodiment of the invention as described above there is an apparatus comprising:

means for determining (one or more transceivers 160, Memory(ies) 155, Computer Program Code 153 and/or Mapping Module 150-2, and Processor(s) 152 and/or Mapping Module 150-1 as in FIG. 10), by a network node (eNB/gNB 170 as in FIG. 10) of a communication network (Network 100 as in FIG. 10), random access channel parameters for random access to the communication network; means, based on the random access channel parameters, for deriving (one or more transceivers 160, Memory(ies) 155, Computer Program Code 153 and/or Mapping Module 150-2, and Processor(s) 152 and/or Mapping Module 150-1 as in FIG. 10) a set of random access channel occasions in a time domain and frequency domain, wherein based on the derived set of random access channel occasions, there is means for mapping (one or more transceivers 160, Memory(ies) 155, Computer Program Code 153 and/or Mapping Module 150-2, and Processor(s) 152 and/or Mapping Module 150-1 as in FIG. 10) at least one synchronization signal block index to a number of at least one random access channel occasion of the set of random access channel occasions in at least one of the time domain or the frequency domain, wherein the mapping is based on a time extension; then based on the mapping, means for receiving (one or more transceivers 160, Memory(ies) 155, Computer Program Code 153 and/or Mapping Module 150-2, and Processor(s) 152 and/or Mapping Module 150-1 as in FIG. 10) from a user equipment of the communication network Msg1 preamble repetitions using at least part of the number of at least one random access channel occasions.

In the example aspect of the invention according to the paragraph above, wherein at least the means for determining, deriving, mapping or receiving comprises a non-transitory computer readable medium [Memory(ies) 155 as in FIG. 10] encoded with a computer program [Computer Program Code 153 and/or Mapping Module 150-2 as in FIG. 10] executable by at least one processor [Processor(s) 152 and/or Mapping Module 150-1 as in FIG. 10].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:

(a) hardware-only circuit implementations (such as implementations in only analog and/or digital circuitry); and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:

at least one processor; and at least one memory including computer program code, the at least one memory and the computer program code configured to, with the at least one processor, cause the apparatus to:

determine, by a user equipment of a communication network, random access channel parameters for random access to the communication network;

based on the random access channel parameters, derive a set of random access channel occasions in a time domain and frequency domain;

based on the derived set of random access channel occasions, map at least one synchronization signal block index to a number of at least one random access channel occasion of the set of random access channel occasions in the time domain and the frequency domain; and send towards a network node of the communication network Msg1 preamble repetitions using at least part of the number of at least one random access channel occasions, wherein the mapping is based on a time extension that limits the mapping of the at least one synchronization signal block index in the time domain and is expressed as a number of symbols and slots;

wherein the random access channel parameters comprise a number of consecutive random access channel occasions to map to a predetermined synchronization signal block index and a maximum number of repetitions for a predetermined synchronization signal block index;

wherein more than one random access channel occasion of the set of random access channel occasions is configured in the frequency domain for a same time instance in the time domain;

wherein when the mapping reaches the time extension, the mapping continues in at least one random access channel occasion within the time extension in another frequency different from the frequencies used before reaching the time extension; and wherein the mapping is derived from an initial mapping and the random access channel parameters comprise a stretching parameter and the initial mapping is stretched in time according to the stretching parameter to derive the mapping.

2. The apparatus of claim 1, wherein the mapping is performed in the time domain in at least one random access channel occasion centered on at least one frequency in the frequency domain.

3. The apparatus of claim 1, wherein the mapping is performed in the time domain in different frequencies in the frequency domain.

4. The apparatus of claim 1, wherein an initial mapping is performed first in the frequency domain and then in the time domain in at least one random access channel occasion, and wherein the mapping is derived from the initial mapping.

5. The apparatus of claim 1, wherein the random access channel parameters comprise an indication of a number of synchronization signal block indexes to map per random access channel occasion.

6. The apparatus of claim 1, wherein the random access channel parameters comprise an indication of a number of preambles per synchronization signal block index.

7. The apparatus of claim 1, wherein more than one random access channel occasion of the set of random access channel occasions is configured in the frequency domain for a same time instance in the time domain, and wherein a first number of the more than one random access channel occasion configured for a same time instance in the frequency domain is used for the initial mapping and another number of the more than one random access channel occasion is used when the mapping has reached the time extension.

8. The apparatus of claim 1, wherein, based on determining that mapped random access channel occasions do not entirely fit within the time extension, the apparatus stops mapping in the time domain and continues mapping in the frequency domain in the first random access channel occasion in the frequency domain from slot number 0 of a first frame.

9. The apparatus of claim 1, wherein the random access channel parameters comprise an indication of a number of synchronization signal block indexes to map per random access channel occasion and a number of preambles per synchronization signal block index.

10. The apparatus of claim 1, wherein the time extension is further characterized by a time offset and periodicity, the time offset defined as the time of the first occurrence of the time extension and the periodicity defined as the number of symbols and slots between the start of one time extension and the start of a next time extension.

11. The apparatus of claim 1, wherein the time extension is one of pre-determined by the user equipment or received from the communication network.

12. The apparatus of claim 1, wherein the mapping is performed in the time domain in at least one random access channel occasion centered on at least one frequency in the frequency domain.

13. The apparatus of claim 1, wherein the random access channel parameters comprise an indication of a number of synchronization signal block indexes to map per random access channel occasion.

14. The apparatus of claim 1, wherein the random access channel parameters comprise an indication of a number of preambles per synchronization signal block index.

15. The apparatus of claim 1, wherein, based on determining that mapped random access channel occasions do not entirely fit within the time extension, the apparatus stops mapping in the time domain and continues mapping in the frequency domain, in the first random access channel occasion in the frequency domain from slot 0 of a first frame.

16. A method, comprising:

determining, by a user equipment of a communication network, random access channel parameters for random access to the communication network;

based on the random access channel parameters, deriving a set of random access channel occasions in a time domain and frequency domain;

based on the derived set of random access channel occasions, mapping at least one synchronization signal block index to a number of at least one random access channel occasion of the set of random access channel occasions in at least one of the time domain or the frequency domain, wherein the mapping is based on a time extension; and sending towards a network node of the communication network Msg1 preamble repetitions using at least part of the number of at least one random access channel occasions, wherein the mapping is based on a time extension that limits the mapping of the at least one synchronization signal block index in the time domain and is expressed as a number of symbols and slots;

wherein the random access channel parameters comprise a number of consecutive random access channel occasions to map to a predetermined synchronization signal block index and a maximum number of repetitions for a predetermined synchronization signal block index;

wherein more than one random access channel occasion of the set of random access channel occasions is configured in the frequency domain for a same time instance in the time domain;

wherein when the mapping reaches the time extension, the mapping continues in at least one random access channel occasion within the time extension in another frequency different than the different frequencies in the frequency domain; and wherein the random access channel parameters comprise a stretching parameter and the initial mapping is stretched in time according to the stretching parameter to derive the mapping.

17. An apparatus comprising:

at least one processor; and at least one memory including computer program code, the at least one memory and the computer program code configured to, with the at least one processor, cause the apparatus to:

determine, by a network node of a communication network, random access channel parameters for random access to the communication network;

based on the random access channel parameters, derive a set of random access channel occasions in a time domain and frequency domain;

wherein based on the derived set of random access channel occasions, there is mapping at least one synchronization signal block index to a number of at least one random access channel occasion of the set of random access channel occasions in at least one of the time domain or the frequency domain, wherein the mapping is based on a time extension; and based on the mapping, receive from a user equipment of the communication network Msg1 preamble repetitions using at least part of the number of at least one random access channel occasions, wherein the mapping is based on a time extension that limits the mapping of the at least one synchronization signal block index in the time domain and is expressed as a number of symbols and slots;

wherein the random access channel parameters comprise a number of consecutive random access channel occasions to map to a predetermined synchronization signal block index and a maximum number of repetitions for a predetermined synchronization signal block index;

wherein more than one random access channel occasion of the set of random access channel occasions is configured in the frequency domain for a same time instance in the time domain;

wherein when the mapping reaches the time extension, the mapping continues in at least one random access channel occasion within the time extension in another frequency different than the different frequencies in the frequency domain; and wherein the random access channel parameters comprise a stretching parameter and the initial mapping is stretched in time according to the stretching parameter to derive the mapping.

18. The apparatus of claim 17, wherein the mapping is performed in the time domain in at least one random access channel occasion centered on at least one frequency in the frequency domain.

19. The apparatus of claim 17, wherein an initial mapping is performed first in the frequency domain and then in the time domain in at least one random access channel occasion, and wherein the mapping is derived from the initial mapping.

* * * * *